(12) United States Patent
Shea et al.

(10) Patent No.: US 10,670,170 B2
(45) Date of Patent: Jun. 2, 2020

(54) SYSTEM AND METHOD FOR HANGING A CABLE

(71) Applicant: HUBBELL INCORPORATED, Shelton, CT (US)

(72) Inventors: Devan Shea, Hampstead, NH (US); Sarah Parsons, Medford, MA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/001,753

(22) Filed: Jun. 6, 2018

(65) Prior Publication Data

US 2018/0347727 A1 Dec. 6, 2018

Related U.S. Application Data

(60) Provisional application No. 62/515,601, filed on Jun. 6, 2017.

(51) Int. Cl.
| | |
|---|---|
| *F16L 3/233* | (2006.01) |
| *H02G 3/04* | (2006.01) |
| *F16L 3/133* | (2006.01) |
| *F16L 3/127* | (2006.01) |

(52) U.S. Cl.
CPC ............ *F16L 3/233* (2013.01); *F16L 3/127* (2013.01); *F16L 3/133* (2013.01); *H02G 3/0456* (2013.01)

(58) Field of Classification Search
CPC . F16L 3/233; F16L 3/133; F16L 3/127; F16L 3/223; H02G 7/10
See application file for complete search history.

(56) References Cited

U.S. PATENT DOCUMENTS

| | | | | | |
|---|---|---|---|---|---|
| 310,938 | A | * | 1/1885 | Gilliland | H02G 7/10 248/61 |
| 447,297 | A | * | 3/1891 | Carpenter | F16L 3/14 248/58 |
| 837,185 | A | * | 11/1906 | Brown | H02G 7/10 248/61 |
| 887,578 | A | * | 5/1908 | Beyer | F16L 3/14 174/170 |
| 1,331,248 | A | * | 2/1920 | Dissel | H02G 7/10 248/61 |

(Continued)

FOREIGN PATENT DOCUMENTS

| | | | | | |
|---|---|---|---|---|---|
| DE | 1059998 B | * | 6/1959 | | H02G 7/10 |
| JP | 11205963 A | * | 7/1999 | | F16L 3/223 |

OTHER PUBLICATIONS

PCT/US2018/036325 International Search Report and Written Opinion dated Sep. 19, 2018 (13 pages).

*Primary Examiner* — Eret C McNichols
(74) *Attorney, Agent, or Firm* — Michael Best & Friedrich, LLP

(57) ABSTRACT

A cable hanger includes a first cable support portion, a second cable support portion, and a hanger support portion. The first cable support portion is configured to hold one or more first cables. The second cable support portion is configured to hold one or more second cables. The hanger support portion is configured to retain the first cable support portion and the second cable support portion. The first cable support portion, the second cable support portion, and the hanger support portion are formed from a single piece of material.

10 Claims, 4 Drawing Sheets

(56) References Cited

U.S. PATENT DOCUMENTS

| | | | | |
|---|---|---|---|---|
| 1,336,558 | A * | 4/1920 | Bancroft | H02G 7/10 248/61 |
| 1,373,164 | A * | 3/1921 | Brenizer | H02G 7/10 248/61 |
| 1,841,479 | A * | 1/1932 | Jessen | H02G 7/10 248/61 |
| 1,869,407 | A * | 8/1932 | Brenizer | H02G 7/10 248/61 |
| 1,967,134 | A * | 7/1934 | Short | H02G 7/10 174/41 |
| 2,106,006 | A * | 1/1938 | Klein | H02G 7/10 248/61 |
| 2,122,925 | A * | 7/1938 | Bins | E21F 1/06 248/61 |
| 2,172,174 | A * | 9/1939 | Pierson | H02G 7/10 248/61 |
| 2,384,440 | A * | 9/1945 | Carr | H02G 7/10 248/61 |
| 2,718,545 | A * | 9/1955 | Thurman | H01B 17/145 174/164 |
| 2,744,707 | A * | 5/1956 | Peterson | G02B 6/486 174/41 |
| 2,934,594 | A * | 4/1960 | Flower | H02G 7/12 174/146 |
| 3,136,515 | A | 6/1964 | Potruch | |
| 3,878,590 | A * | 4/1975 | Bolger | A01G 17/08 248/317 |
| 4,099,299 | A * | 7/1978 | Bruggert | A01G 17/08 24/336 |
| 4,245,806 | A * | 1/1981 | Vangreen | F16L 3/133 248/59 |
| 4,407,472 | A * | 10/1983 | Beck | A62C 33/04 24/339 |
| 4,669,422 | A * | 6/1987 | Steudler, Jr. | A01K 7/00 119/72 |
| 4,795,856 | A * | 1/1989 | Farmer | F16L 3/223 174/40 R |
| 4,840,333 | A * | 6/1989 | Nakayama | F16B 5/12 248/68.1 |
| 5,021,612 | A * | 6/1991 | Joffe | H02G 7/12 174/146 |
| 5,303,885 | A | 4/1994 | Wade | |
| D387,652 | S * | 12/1997 | Carlson, Jr. | D8/356 |
| D570,294 | S * | 6/2008 | Newcomb | D13/154 |
| 7,748,675 | B2 * | 7/2010 | Nestor | B60P 3/36 248/273 |
| 8,398,034 | B2 * | 3/2013 | Lambert | F16L 3/237 248/68.1 |
| 8,783,628 | B2 * | 7/2014 | Jette | H02G 3/0443 248/60 |
| 9,800,028 | B1 * | 10/2017 | Smith | F16L 3/223 |
| 10,082,225 | B1 * | 9/2018 | Ramsey | F16L 3/14 |
| 2005/0087662 | A1 * | 4/2005 | Jacobs | F16L 3/14 248/339 |
| 2011/0303799 | A1 * | 12/2011 | Blanchard | B64C 1/406 248/65 |
| 2015/0377388 | A1 * | 12/2015 | Thackeray | F16L 3/12 248/62 |
| 2016/0153587 | A1 | 6/2016 | Smith | |

* cited by examiner

SYSTEM AND METHOD FOR HANGING A CABLE

CROSS-REFERENCE TO RELATED APPLICATIONS

The application claims priority to the U.S. Provisional Patent Application No. 62/515,601, filed Jun. 6, 2017, the entire contents of which is incorporated by reference herein.

FIELD

Embodiments relate to a system and method for hanging cable.

SUMMARY

Problems may arise when trenching for underground cable. For example, there may be flooding and/or deep mud. Additionally, material costs and/or labor costs may arise with various construction and/or environmental issues once trenching begins. Carrying cable above ground eliminates the problems associated with trenching and provides more predictable project costs.

In one embodiment, a cable hanger includes a first cable support portion, a second cable support portion, and a hanger support portion. The first cable support portion is configured to hold one or more first cables. The second cable support portion is configured to hold one or more second cables. The hanger support portion is configured to retain the first cable support portion and the second cable support portion. The first cable support portion, the second cable support portion, and the hanger support portion are formed from a single piece of material.

Another embodiment provides a method of retaining one or more cables. The method includes providing a single piece of material and forming, from the single piece of material, a hanger support portion. The method further includes forming, from the single piece of material, a first cable support portion configured to hold one or more first cables, and forming, from the single piece of material, a second cable support portion configured to hold one or more second cables.

In yet another embodiment, an apparatus for hanging cable includes a hanging portion, a first compartment configured to retain one or more first cables, and a second compartment configured to retain one or more second cables. The hanging portion, the first compartment, and the second compartment are integrally formed as a single piece.

Other aspects of the disclosure will become apparent by consideration of the detailed description and accompanying drawings.

DETAILED DESCRIPTION

Figure 1:
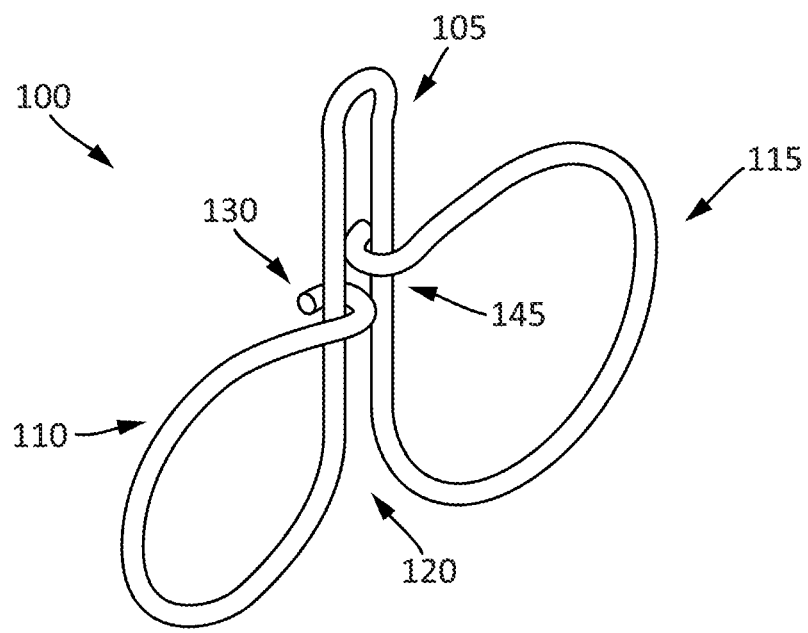
FIG. 1 is a perspective view of a cable hanger according to some embodiments.

Before any embodiments of the present disclosure are explained in detail, it is to be understood that the disclosure is not limited in its application to the details of construction and the arrangement of components set forth in the following description or illustrated in the following drawings. The present disclosure is capable of other embodiments and of being practiced or of being carried out in various ways.

FIGS. 1-4 illustrate a cable hanger 100 according to some embodiments. The cable hanger 100 is configured to hold, or secure, one or more wires, or cables. In some embodiments, the cable hanger 100 is configured to secure one or more cables having a combined weight of approximately 250 kg to approximately 300 kg. In some embodiments, the cable hanger 100 has a height of approximately 140 mm to approximately 215 mm and a length of approximately 175 mm to approximately 270 mm.

The cable hanger 100 includes a hanger support portion 105, a first cable support portion, or compartment, 110, and a second cable support portion, or compartment, 115. The hanger support portion 105, first cable support portion 110, and second cable support portion 115 may be integrally formed as a single piece. In some embodiments, the cable hanger 110 is formed of a material (for example, a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, a single rod of powder coated zinc steel, etc.). In some embodiments, the material is a rod having a thickness of approximately 4 mm to approximately 7 mm.

Figure 2:
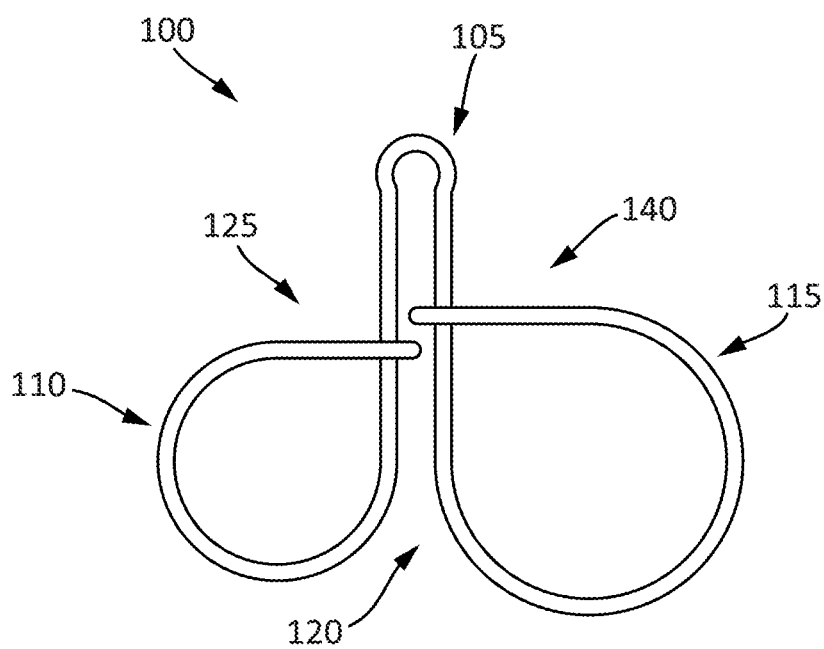
FIG. 2 is a front view of the cable hanger of FIG. 1 according to some embodiments.

The hanger support portion 105 is configured to support, or secure, the first and second cable support portions 110, 115 to an external device (for example, a guy wire, or messenger wire). In the illustrated embodiment, the hanger support portion 105 is open at a bottom portion 120 (FIGS. 1 and 2). In other embodiments, the hanger support portion 105 may form a closed loop. In some embodiments, the hanger support portion 105 has a radius of approximately 6 mm to approximately 13 mm.

Figure 5:
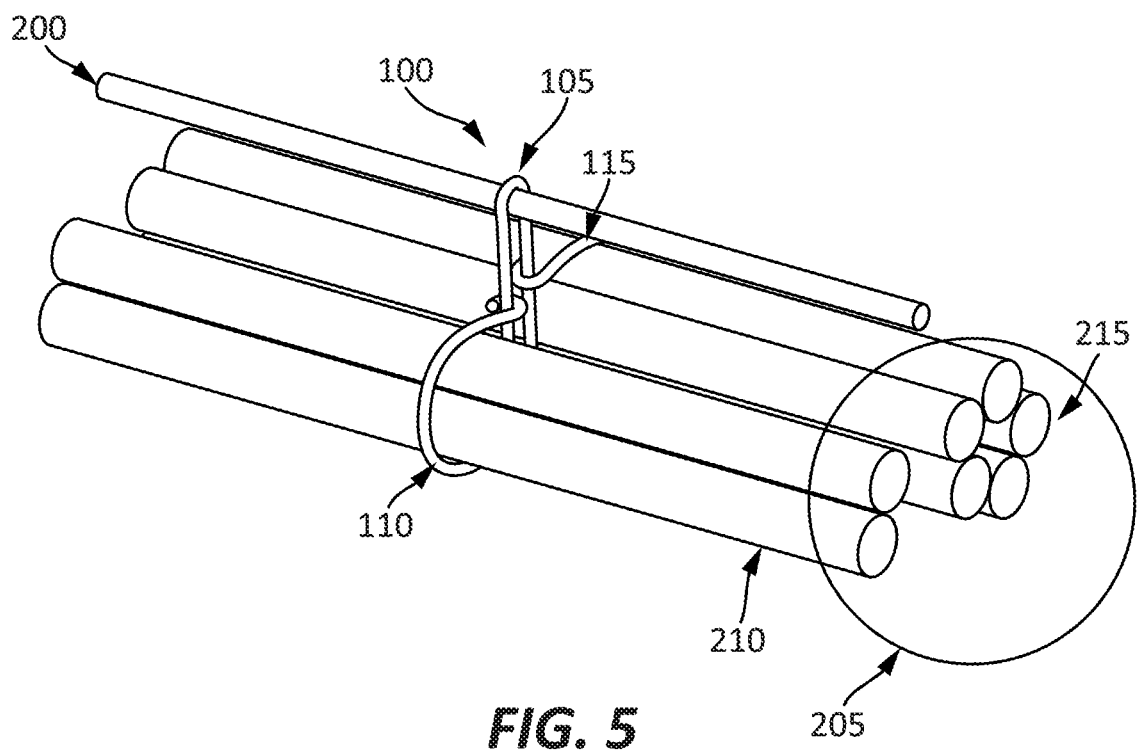
FIG. 5 is a front perspective view of the cable hanger of FIG. 1 retaining, or holding, a plurality of cables according to some embodiments.

The first cable support portion 110 is configured to support, or hold, one or more first cables 205 (FIG. 5). In the illustrated embodiment, the first cable support portion 110 forms a closed loop. However, in other embodiments, the first cable support portion 110 may be open at an upper portion 125. In some embodiments, the first cable support 110 has a radius of approximately 19 mm to approximately 77 mm (for example, approximately 38 mm).

As illustrated, the first cable support portion 110 forms a loop, or ring-like structure, and is secured to the hanger support portion 105 by a first retainer 130. The first retainer 130 may be configured to "lock" and "unlock" the first cable support portion 110 in place. In some embodiments, for example as illustrated, the first retainer 130 is a hook. In such an embodiment, the first retainer 130 may have a radius of approximately 3 mm to approximately 7 mm.

Figure 3:
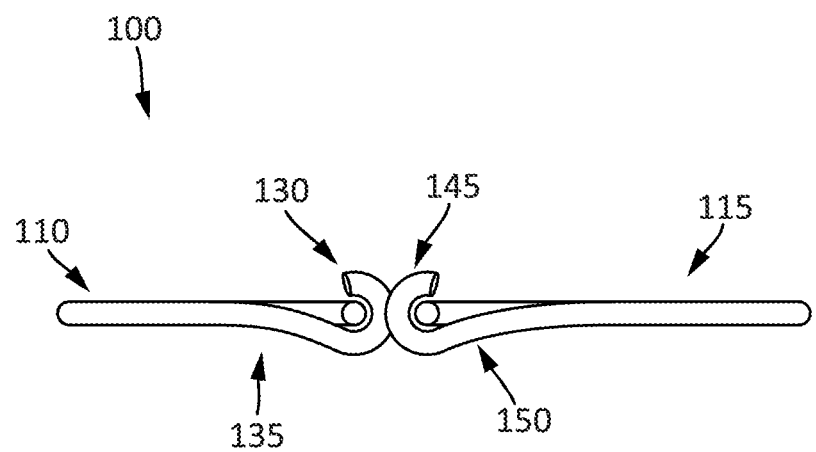
FIG. 3 is a top view of the cable hanger of FIG. 1 according to some embodiments.
Figure 4:
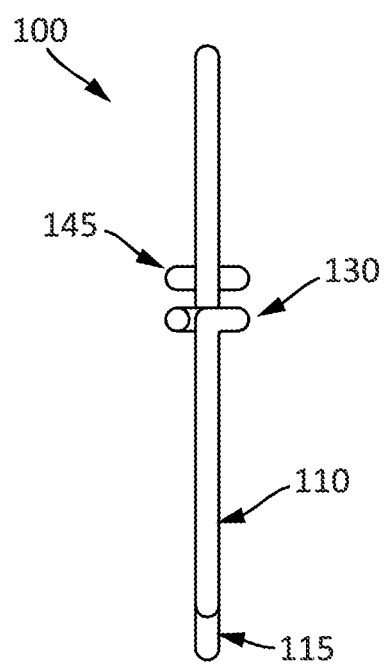
FIG. 4 is a side view of the cable hanger of FIG. 1 according to some embodiments.

As illustrated in FIG. 3, the first retainer 130 may include an angled portion 135. The angled portion 135 is configured to promote the "locking" and "unlocking" while providing a secure connection between the first cable support 110 and the hanger support portion 105. In some embodiments, the angled portion 135 has an angle of approximately 140° to approximately 170° (for example, 161°).

The second cable support portion 115 is configured to support, or hold, one or more second cables 210 (FIG. 5). In the illustrated embodiment, the second cable support portion 115 forms a closed loop. However, in other embodiments, the second cable support portion 115 may be open at an upper portion 140. In some embodiments, the second cable support 115 has a radius of approximately 19 mm to approximately 77 mm (for example, approximately 50 mm). In some embodiments, the first cable support portion 110 and the second cable support portion 115 have substantially similar radii. In other embodiments, the first cable support portion 110 and the second cable support portion 115 have different radii.

As illustrated, the second cable support portion 115 forms a loop, or ring-like structure, and is secured to the hanger support portion 105 by a second retainer 145. The second retainer 145 may be configured to "lock" and "unlock" the second cable support portion 115 in place. In some embodiments, for example as illustrated, the second retainer 145 is a hook. In such an embodiment, the second retainer 145 may have a radius of approximately 3 mm to approximately 7 mm.

As illustrated in FIG. 3, the second retainer 145 may include an angled portion 150. The angled portion 150 is configured to promote the "locking" and "unlocking" while providing a secure connection between the second cable support 115 and the hanger support portion 105. In some embodiments, the angled portion 150 has an angle of approximately 140° to approximately 170° (for example, 161°).

Figure 6:
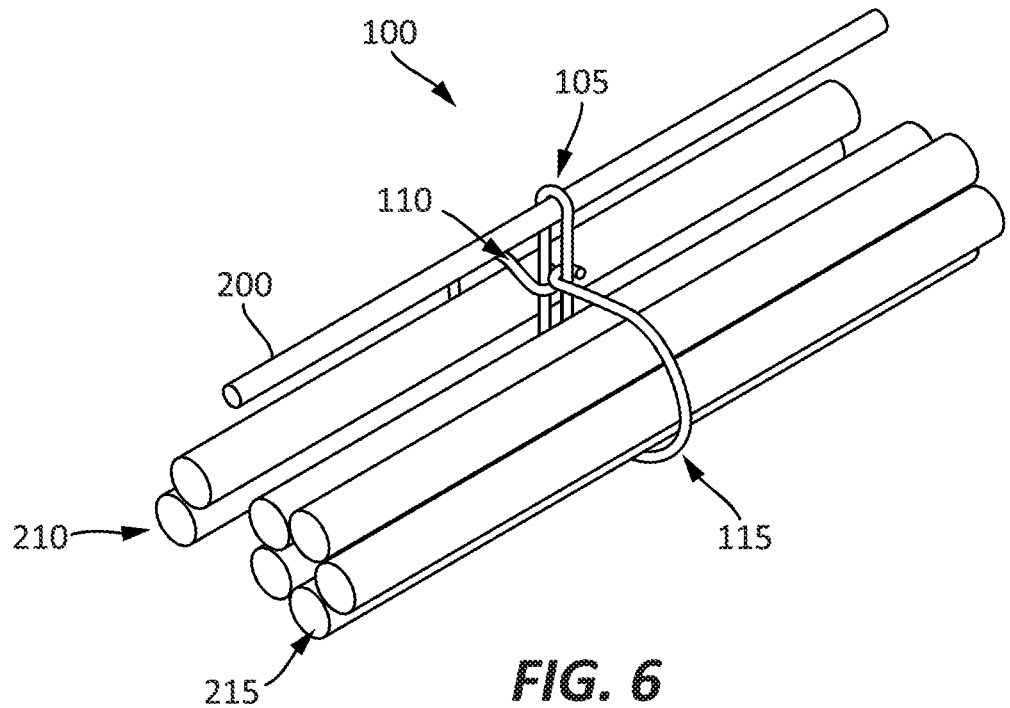
FIG. 6 is a rear perspective view of the cable hanger of FIG. 1 retaining, or holding, a plurality of cables according to some embodiments.

FIGS. 5 and 6 illustrate the cable hanger 100 secured to a wire 200 (for example, a guy wire, a messenger wire, etc.) and retaining a plurality of cables 205. In some embodiments, the plurality of cables 205 includes one or more first cables 210 and one or more second cables 215. In some embodiments, the one or more first cables 210 are direct-current (DC) cables, while the one or more second cables 215 are alternating-current (AC) cables. In other embodiments, the one or more first cables 210 are AC cables, while the one or more second cables 215 are DC cables. In yet another embodiment, the one or more first cables 210 include AC and DC cables and the one or more second cables 215 includes AC and DC cables. In yet other embodiments, the first and second cables 205, 210 may be a combination of various cables.

In operation, the cable hanger 100 is secured to the wire 200 via the hanger support portion 105, while the one or more first cables 210 are supported, or held, by the first cable support portion 110 and the one or more second cables 215 are supported, or held, by the second cable support potion 115. Thus, the one or more first and second cables 210, 215 are secured to the wire 200 via the cable hanger 100.

Figure 7:
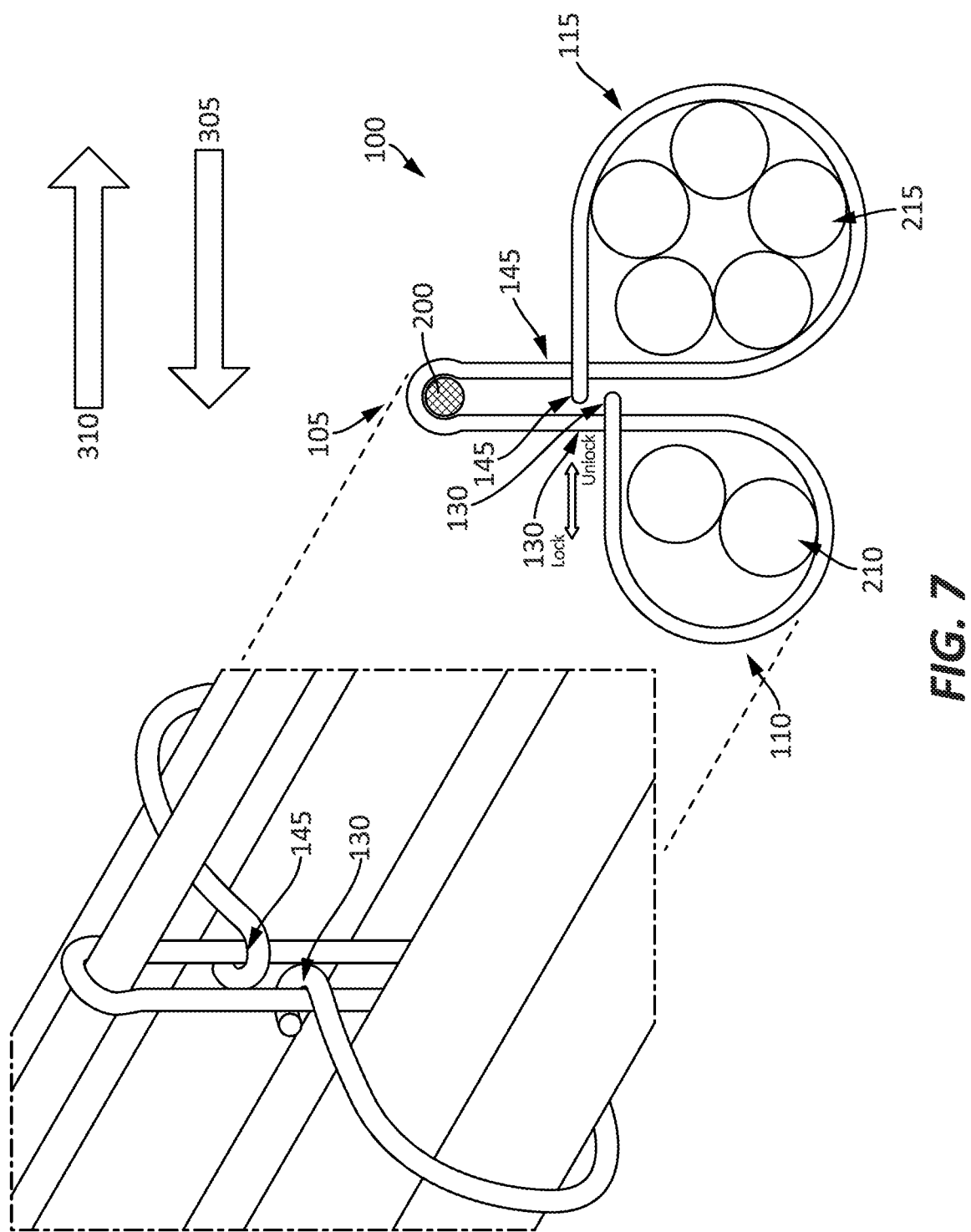
FIG. 7 is a front and an enlarged perspective view of the cable hanger of FIG. 1 retaining, or holding, a plurality of cables according to some embodiments.

As illustrated in FIG. 7, the first and second cable support portions 110, 115 may be in a locked position or an unlocked position. In the locked position, the first and second retainers 130, 145 of the first and second cable support portions 110, 115, respectively, are secured to a portion of the hanger support portion 105. In the unlocked position, the first and second retainers 130, 145 are unsecured to the hanger support portion 105.

In some embodiments, the first retainer 130 is biased in a first direction 305. In such an embodiment, the first retainer 130 may be biased via the geometry of the first cable support portion 110. In such an embodiment, a user applies force to the first retainer 130 in a second direction 310 to unlatch the first retainer 130 from the hanger support portion 105. Once unlatched, the first retainer 130 is configured to move in the first direction 305, via the bias, and thus unlock the first cable support portion 110. Once unlocked, the one or more first cables 210 may be placed within the first cable support portion 110. The first cable support portion 110 may then be placed in the locked position to further secure the one or more first cables 210.

In some embodiments, the second retainer 145 is biased in the second direction 310. In such an embodiment, the second retainer 145 may be biased via the geometry of the second cable support portion 115. In such an embodiment, a user applies force to the second retainer 145 in the first direction 305 to unlatch the second retainer 145 from the hanger support portion 105. Once unlatched, the second retainer 145 is configured to move in the second direction 310, via the bias, and thus unlock the second cable support portion 115. Once unlocked, the one or more second cables 215 may be placed within the second cable support portion 115. The second cable support portion 115 may then be placed in the locked position to further secure the one or more second cables 215.

Thus, the disclosure provides, among other things, an apparatus and method for retaining, or holding, cables. The apparatus and method described herein provide a user with the ability to hold cables above ground rather than trenching for underground cable routes. Various features and advantages of the disclosure are set forth in the following claims.

What is claimed is:

1. A method of retaining one or more cables, the method comprising:
  providing a single piece of material;
  forming, from the single piece of material, a hanger support portion;
  forming, from the single piece of material, a first cable support portion including a retainer, the first cable support portion configured to hold one or more first cables;
  forming, from the single piece of material, a second cable support portion configured to hold one or more second cables, and
  securing the retainer to the hanger support portion;
  wherein the single piece of material is formed of at least one selected from a group consisting of a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, and a single rod of powder coated zinc steel.

2. The method of claim 1, wherein the first cable support portion is formed into a first loop and the second cable support portion is formed into a second loop.

3. The method of claim 1, wherein the second cable support portion includes a retainer, the method further comprising securing the retainer of the second cable portion to the hanger support portion.

4. The method of claim 1, wherein the one or more first cables includes at least one selected from a group consisting of an alternating-current (AC) cable and a direct-current (DC) cable.

5. The method of claim 1, wherein the one or more second cables includes at least one selected from a group consisting of an alternating-current (AC) cable and a direct-current (DC) cable.

6. The method of claim 1, wherein the hanger support portion is configured to retain first cable support portion and the second cable support portion to at least one selected from the group consisting of a guy wire and a messenger wire.

7. The method of claim 1, wherein the a retainer is a hook, the method further comprising biasing the hook in a first direction and wrapping the hook around the hanger support portion.

8. An apparatus for hanging cable, the apparatus comprising:
a hanging portion;
a first compartment configured to retain one or more first cables, the first compartment moveable between a lock position and an unlocked position; and
a second compartment configured to retain one or more second cables;
wherein the hanging portion, the first compartment, and the second compartment are integrally formed as a single piece; and
wherein the first compartment is secured to a portion of the hanging portion in the locked position, and is unsecured to the portion of the hanging portion in the unlocked position;
wherein the hanging portion, the first compartment, and the second compartment are formed of at least one selected from a group consisting of a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, and a single rod of powder coated zinc steel.

9. The apparatus of claim 8, wherein the first compartment includes a first loop and the second compartment includes a second loop.

10. The apparatus of claim 8, wherein the hanging portion is configured to secure the first compartment and the second compartment to at least one selected from a group consisting of a guy wire and a messenger wire.

* * * * *